(12) United States Patent
Han et al.

(10) Patent No.: US 11,507,264 B2
(45) Date of Patent: Nov. 22, 2022

(54) METHOD AND DEVICE FOR MANAGING INFORMATION

(71) Applicant: BEIJING XIAOMI MOBILE SOFTWARE CO., LTD., Beijing (CN)

(72) Inventors: Pan Han, Beijing (CN); Lei Zhang, Beijing (CN); Dan Lu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/746,522

(22) Filed: Jan. 17, 2020

(65) Prior Publication Data
US 2021/0096734 A1  Apr. 1, 2021

(30) Foreign Application Priority Data

Sep. 26, 2019 (CN) .......................... 201910914635.5

(51) Int. Cl.
| | | |
|---|---|---|
| G06F 3/048 | (2013.01) | |
| G06F 3/04847 | (2022.01) | |
| G06F 3/04845 | (2022.01) | |
| G06F 3/04855 | (2022.01) | |
| G06Q 10/10 | (2012.01) | |
| G06F 3/04883 | (2022.01) | |
| G06F 3/0489 | (2022.01) | |
| G06F 3/16 | (2006.01) | |

(52) U.S. Cl.
CPC ...... *G06F 3/04847* (2013.01); *G06F 3/04845* (2013.01); *G06F 3/04855* (2013.01); *G06Q 10/1093* (2013.01); *G06F 3/0489* (2013.01); *G06F 3/04883* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 9,978,043 B2 * | 5/2018 | Jon ........................ | G06F 3/0484 |
| 2004/0160416 A1 * | 8/2004 | Venolia ............... | G06F 3/04847 |
| | | | 345/157 |
| 2008/0165151 A1 * | 7/2008 | Lemay ................ | G06F 3/04883 |
| | | | 345/173 |

(Continued)

FOREIGN PATENT DOCUMENTS

| | | |
|---|---|---|
| CN | 109741023 A | 5/2019 |
| KR | 101970154 B1 | 4/2019 |

OTHER PUBLICATIONS

Extended European Search Report in the European Application No. 20152696.9 dated Feb. 25, 2020, (7p).

(Continued)

*Primary Examiner* — William C Trapanese
(74) *Attorney, Agent, or Firm* — Arch & Lake LLP (57) ABSTRACT

The present disclosure provides a method and device for managing information, relating to the field of terminal information management, and solving the problem of cumbersome operation of information management. The method includes displaying, at a mobile terminal comprising a microprocessor, a network connection, and a display, a calendar interface, and when an operating instruction indicating extended display input by a user is detected on the calendar interface, displaying, at the mobile terminal, associated information corresponding to a date at a preset display position of the calendar interface.

20 Claims, 7 Drawing Sheets

| Monday | Tuesday | Wednesday | Thursday | Friday | Saturday | Sunday |
|---|---|---|---|---|---|---|
| 1 | 2 | 3 | 4 | 5 | 6 | 7 |
| Progress report meeting at 2:00 PM | | Appointment with dentist at 8:00 AM | | | Private jujitsu lesson at 9:00 AM | |
| Light rain | Light rain | Light rain to overcast | Cloudy | Overcast | Overcast to light rain | Light rain to overcast |
| 19℃/27℃ | 18℃/21℃ | 19℃/23℃ | 20℃/29℃ | 19℃/27℃ | 19℃/25℃ | 18℃/21℃ |
| 8 | 9 | 10 | 11 | 12 | 13 | 14 |
| Overcast to moderate rain | Light rain | Overcast to cloudy | Overcast to cloudy | Overcast to cloudy | Moderate rain | Moderate rain |
| 17℃/22℃ | 16℃/23℃ | 16℃/22℃ | 15℃/22℃ | 15℃/19℃ | 14℃/20℃ | 15℃/25℃ |

(56) References Cited

U.S. PATENT DOCUMENTS

| | | | |
|---|---|---|---|
| 2009/0019107 A1* | 1/2009 | Lance | G06Q 10/00 |
| | | | 709/203 |
| 2011/0173221 A1* | 7/2011 | Ahiakpor | G06Q 10/109 |
| | | | 707/769 |
| 2013/0268875 A1* | 10/2013 | Han | G06F 3/0482 |
| | | | 715/769 |
| 2014/0082536 A1* | 3/2014 | Costa | G06F 3/04847 |
| | | | 715/765 |
| 2014/0104158 A1* | 4/2014 | Abdukalykov | H04M 1/72566 |
| | | | 345/156 |
| 2016/0196535 A1* | 7/2016 | Mo | G06F 40/183 |
| | | | 715/773 |

OTHER PUBLICATIONS

First Office Action of the Chinese Application No. 201910914635.5, dated Mar. 18, 2022, (17p).

\* cited by examiner

| Monday | Tuesday | Wednesday | Thursday | Friday | Saturday | Sunday |
|--------|---------|-----------|----------|--------|----------|--------|
| 1 | 2 | 3 | 4 | 5 | 6 | 7 |
| 8 | 9 | 10 | 11 | 12 | 13 | 14 |

FIG. 4

| Monday | Tuesday | Wednesday | Thursday | Friday | Saturday | Sunday |
|--------|---------|-----------|----------|--------|----------|--------|
| 1<br><br>Progress report meeting at 2:00 PM<br><br>Light rain<br><br>19℃/27℃ | 2<br><br><br><br>Light rain<br><br>18℃/21℃ | 3<br><br>Appointment with dentist at 8:00 AM<br><br>Light rain to overcast<br><br>19℃/23℃ | 4<br><br><br><br>Cloudy<br><br>20℃/29℃ | 5<br><br><br><br>Overcast<br><br>19℃/27℃ | 6<br><br>Private jujitsu lesson at 9:00 AM<br><br>Overcast to light rain<br><br>19℃/25℃ | 7<br><br><br><br>Light rain to overcast<br><br>18℃/21℃ |
| 8<br><br>Overcast to moderate rain<br><br>17℃/22℃ | 9<br><br>Light rain<br><br>16℃/23℃ | 10<br><br>Overcast to cloudy<br><br>16℃/22℃ | 11<br><br>Overcast to cloudy<br><br>15℃/22℃ | 12<br><br>Overcast to cloudy<br><br>15℃/19℃ | 13<br><br>Moderate rain<br><br>14℃/20℃ | 14<br><br>Moderate rain<br><br>15℃/25℃ |

METHOD AND DEVICE FOR MANAGING INFORMATION

CROSS-REFERENCE TO RELATED APPLICATIONS

The present application claims priority to Chinese Patent Application No. 201910914635.5, filed on Sep. 26, 2019, the entire contents of which are incorporated herein by reference.

TECHNICAL FIELD

The present disclosure relates to the field of terminal information management, and more particularly, to a method and device for managing information.

BACKGROUND

When using a smartphone, a tablet computer, a PC, mobile terminal, and other terminals, a user may set reminders, alarms, and other information through a calendar application to manage own schedules. When the schedule is busy, there may be multiple schedule contents in a day or week, and the process of adding and checking these contents is relatively cumbersome, so it is inconvenient for the user during use.

SUMMARY

According to a first aspect of the present disclosure, a method for managing information is provided, which includes displaying, at a mobile terminal comprising a microprocessor, a network connection, and a display, a calendar interface, and when an operating instruction indicating extended display input by a user is detected on the calendar interface, displaying, at the mobile terminal, associated information corresponding to a date at a preset display position of the calendar interface.

According to a second aspect of the present disclosure, a computer device is provided, which includes: a display screen, one or more processors, and a non-transitory computer-readable medium storing instructions executable by the one or more processors, wherein the one or more processors are configured to: cause the display screen to display a calendar interface; and when an operating instruction indicating extended display input by a user is detected on the calendar interface, display associated information corresponding to a date at a preset display position of the calendar interface.

According to a third aspect of the present disclosure, a non-transitory computer-readable storage medium is provided. When an instruction in the storage medium is executed by the processor of a mobile terminal, the mobile terminal can execute a method for managing information. The method includes displaying a calendar interface, and when an operating instruction indicating extended display input by a user is detected on the calendar interface, displaying associated information corresponding to a date at a preset display position of the calendar interface.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
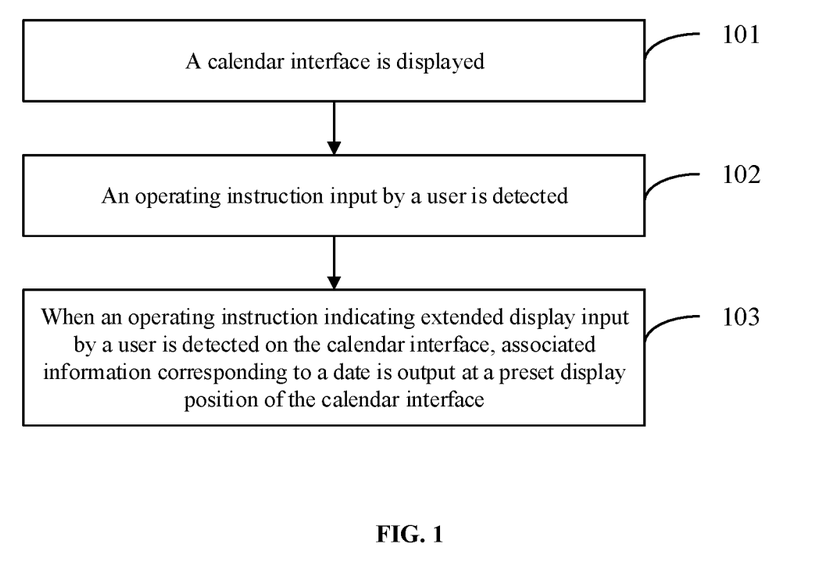
FIG. 1 is a flow chart showing a method for managing information, according to an example of the present disclosure.

An embodiment of the present disclosure provides a method for managing information. As shown in FIG. 1, the process of using the method to perform information management includes the following operations 101 to 103.

In operation 101, a calendar interface is displayed.

In the operation, on terminal devices with an interaction function like a mobile phone and a tablet computer, a calendar application is called according to a user operation, and the calendar interface is displayed.

In operation 102, an operating instruction input by a user is detected.

In the operation, the operating instruction input by the user through an input device of the terminal device is detected. The input device may be a keyboard, a touch screen, a microphone, etc.

When the input device is the keyboard, the operating instruction is character string information generated by pressing the keyboard.

When the input device is the touch screen, the operating instruction is gestures of clicking and swiping the touch screen. In the present disclosure the gesture of "swiping down" on the touch screen on the calendar interface may serve as the operating instruction indicating extended display.

When the input device is the microphone, the operating instruction is a voice instruction.

The terminal device may respond to many different operating instructions, and the same operating instructions may have different meanings in different application interfaces. Multiple operating instructions may be preset in an operating system, and each operating instruction has a set of operating instruction characteristics.

It is to be noted that, there is no strict sequential relationship between this operation and operations 101 and 103, and the process of detecting the operating instruction input by the user exists in the whole running process of the system.

In operation 103, when an operating instruction indicating extended display input by a user is detected on the calendar interface, associated information corresponding to a date is output at a preset display position of the calendar interface.

In the present disclosure, the date may have corresponding schedule information, weather information and other associated information. When the operating instruction indicating extended display input by the user is detected on the calendar interface, the associated information corresponding to the date is output at the preset display position.

The method for managing information provided by the present disclosure may be applied to the terminal devices with an interaction function (such as a mobile phone, a tablet computer, a laptop, a PC, and smart home equipment), and includes that: the calendar interface is displayed, and the operating instruction indicating extended display input by a user is detected on the calendar interface; when the operating instruction indicating extended display is detected, the associated information corresponding to a date is output at the preset display position of the calendar interface. When the extended display is performed, the associated information corresponding to a date is directly presented at the display position corresponding to the date, so there is more information output on the calendar interface, the operation of information management is simplified, and the problem of inconvenience of use for a user is solved.

Figure 2:
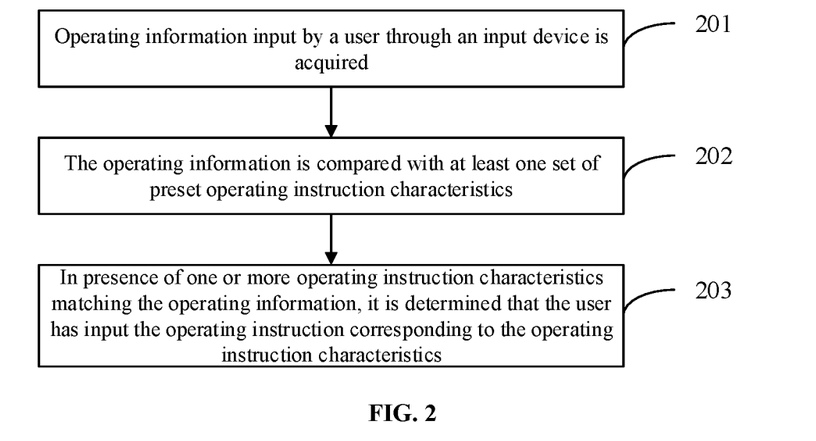
FIG. 2 is a flow chart showing a method for managing information, according to an example of the present disclosure.

An embodiment of the present disclosure further provides a method for managing information. As shown in FIG. 2, the process of using the method to detect the operating instruction includes the following operations 201 to 203.

In operation 201, the operating information input by the user through the input device is acquired.

The input device at least includes any one or more of the following devices:

a keyboard, a touch screen, and a voice recognition device.

The voice recognition device includes a microphone.

In the operation, the operating information input by the user is detected continuously through the input device.

In operation 202, the operating information is compared with at least one set of preset operating instruction characteristics. Each set of operating instruction characteristics corresponds to one operating instruction.

In the present disclosure, at least one set of operating instruction characteristics is preset, and each set of operating instruction characteristics corresponds to one operating instruction. The acquired operating information is analyzed according to the operating instruction characteristic to recognize the operating instruction therein.

In operation 203, in presence of one or more operating instruction characteristics matching the operating information, it is determined that the user has input the operating instruction corresponding to the operating instruction characteristics.

In the operation, if the operating information matches a certain set of operating instruction characteristics, it is determined that the user has input the operating instruction corresponding to the set of operating instruction characteristic, and then a responding operation may be performed according to the recognized operating instruction.

Figure 3:
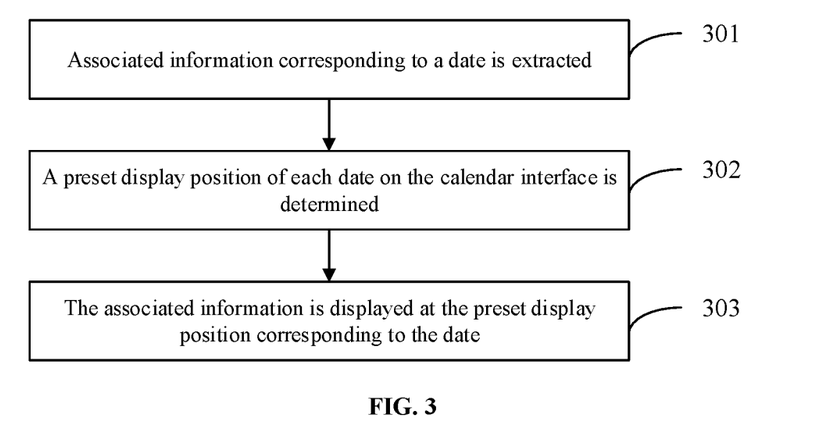
FIG. 3 is a flow chart showing a method for managing information, according to an example of the present disclosure.

An embodiment of the present disclosure further provides a method for managing information. As shown in FIG. 3, the process that when the operating instruction indicating extended display on the calendar interface, the associated information corresponding to a date is output at the preset display position of the calendar interface includes the following operations 301 to 303.

In operation 301, the associated information corresponding to a date is extracted.

In the present disclosure, the associated information at least includes the schedule information and/or the weather information, and further includes user associated information. Here, the associated information may be any information that the calendar can provide for the user to select, such as user subscription information and a to-do list of the user.

The schedule information may be directly set and saved in the calendar application, and extracted when needed. When the schedule information is added when it is detected on the calendar interface that the user has input an operating instruction indicating triggering of schedule setting, the schedule information input by the user and corresponding to a date is acquired, and the schedule information is saved in the calendar application.

The operating instruction indicating triggering of schedule setting may be long pressing any position of the screen on the calendar interface, activating a pop-up window for acquiring the schedule information, and inputting in the pop-up window the specific content of the target date and schedule. The operation of clicking or long pressing a certain date display area may also be set as the operating instruction indicating triggering of schedule setting. In this case, the operating instruction has shown the target date, and after the schedule information input by the user is acquired, the schedule information may be associated with the target date of the operating instruction.

The complete schedule information may be directly displayed as the associated information, or the schedule information may be processed to generate an abstract, and the abstract of the schedule information is displayed as the associated information. For example, the complete content of the schedule information is "quality assessment meeting in meeting room 3102 at 3:00 PM", and then an abstract with content of "meeting at 3:00 PM" may be generated aiming at the schedule information, so as to simplify the content of the associated information.

The weather information may be acquired from a weather application. When it is detected on the calendar interface that the user has input an operating instruction for setting the weather application, it is possible to set that the weather information is acquired from the weather application. "Set weather application" may serve as a function option on the calendar interface, and the user selects, through the function option, the weather application from the applications installed in the system. After the user selects the weather application, in response to the selection, the system sets the weather application as the source of the weather information on the calendar interface.

In the present disclosure, other applications may be added as the source of the associated information, for example, an alarm application, a short message application, and a phone application. Schedules, reminders and alarms associated with date objects may be obtained through the calendar application. Alarm information may be obtained through the alarm application. Call records, missed call reminders and other information may be obtained through the phone application. Third-party applications, such as stock software (for acquiring stock market quotation information) and health management software (for acquiring operation number or exercise goal corresponding to the date object), installed on the terminal device may also be added as the source of the associated information. The present disclosure does not limit this. Those skilled in the art should know that the third-party applications may have interfaces for the calendar application and other system applications to access and acquire information, so as to implement the function of the operation.

When the application is added as the source of the associated information, a list of associated information sources may be maintained through a setting function, and the operation of setting the sources of the associated information may be completed by adding or deleting items in it.

In operation 302, the preset display position of each date on the calendar interface is determined.

The display position at least includes the position below the date.

In the present disclosure, on the calendar interface, a corresponding display position is preset for each date to display an associated system of the date.

Figure 4:
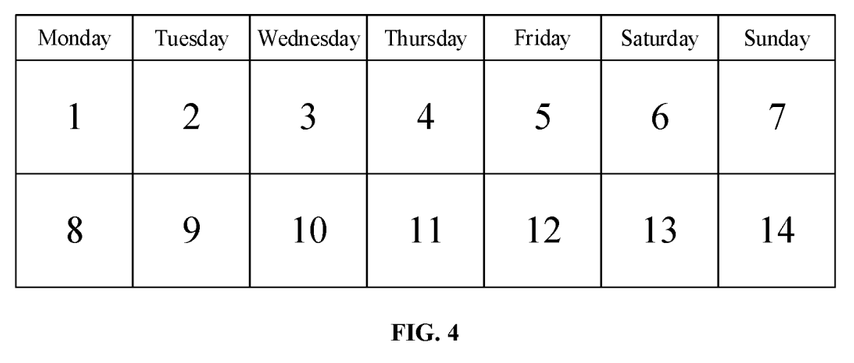
FIG. 4 is a schematic diagram illustrating a calendar interface in a thumbnail mode display mode, according to an example of the present disclosure.
Figure 5:
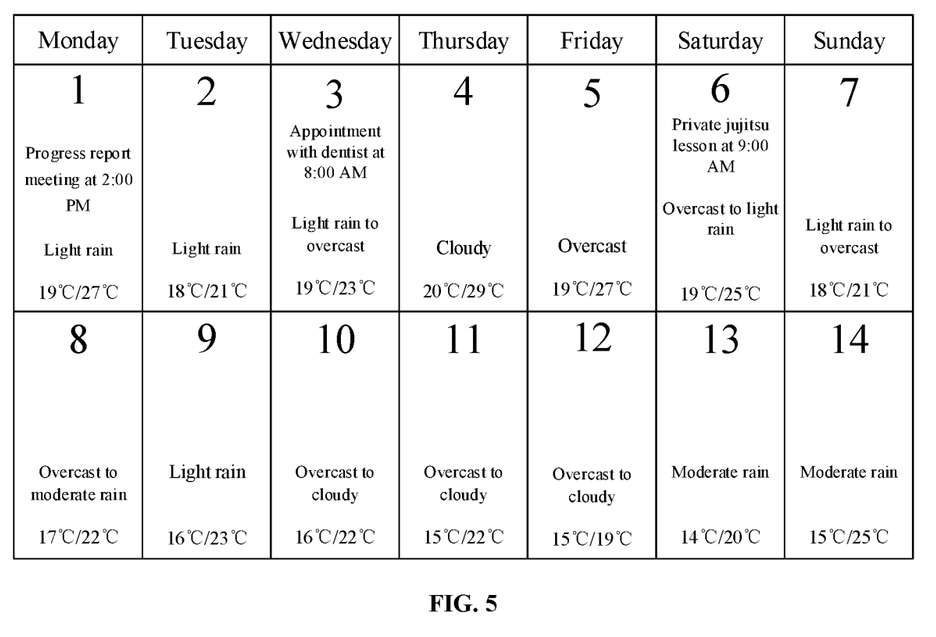
FIG. 5 is a schematic diagram illustrating a calendar interface in an extended mode display mode, according to an example of the present disclosure.

The display position at least includes the position below the date. The grid of each date on the calendar interface is extended downward a bit as the display position, namely the line spacing of each line of dates is expanded. The calendar interface includes two display modes: thumbnail mode and extended mode. FIG. 4 shows a thumbnail mode display mode. FIG. 5 shows an extended mode display mode. The display position for displaying the associated information is set below the date.

In operation 303, the associated information is displayed at the preset display position corresponding to the date.

Figure 6:
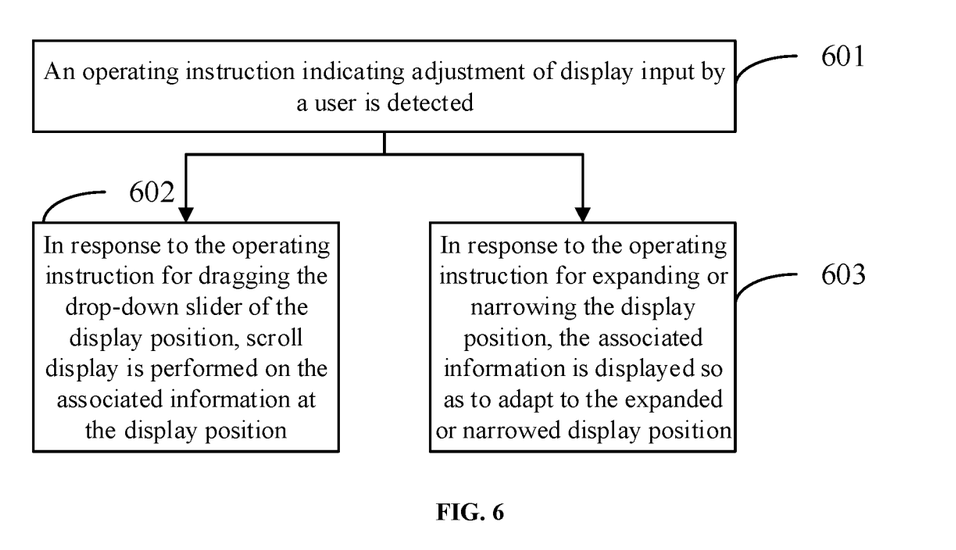
FIG. 6 is a flow chart showing a method for displaying associated information in an adjustment display mode, according to an example of the present disclosure.

In the operation, the associated information is output and displayed at the display position. However, when there are more contents of the associated information, all the associated information cannot be displayed at the display position set for the date at the same time, and the information needs to be folded. In this case, as shown in FIG. 6, the process of adjusting the display mode to display all the associated information includes the following operations 601 to 603.

In operation 601, an operating instruction indicating adjustment of display input by a user is detected.

The operating instruction indicating adjustment of display at least includes any one of the following operating instructions:

dragging a drop-down slider of the display position, and expanding or narrowing the display position.

In operation 602, in response to the operating instruction for dragging the drop-down slider of the display position, scroll display is performed on the associated information at the display position.

When all the associated information cannot be displayed at the display position at the same time, the drop-down slider may be set, and the user drags the displayed content by dragging the drop-down slider, then all the associated information can be browsed.

In operation 603, in response to the operating instruction for expanding or narrowing the display position, the associated information is displayed so as to adapt to the expanded or narrowed display.

When all the associated information cannot be displayed at the display position at the same time, the display position corresponding to the associated information may be expanded, for example, the boundary of the display position is changed by dragging an angle or an edge of the display position, so as to display all the associated information.

Correspondingly, when a certain display position is expanded, the display position of miss may be narrowed to obtain enough space of the display position.

Figure 7:
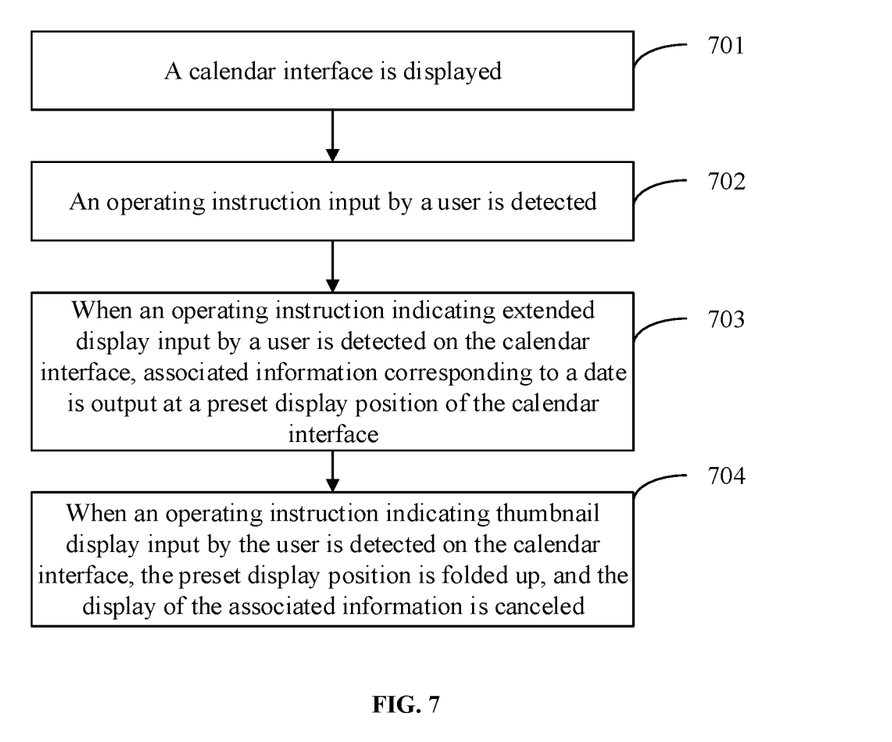
FIG. 7 is a flow chart showing a method for managing information, according to an example of the present disclosure.

An embodiment of the present disclosure further provides a method for managing information, which may return to the calendar interface of thumbnail display after displaying in the extended mode the associated information. The specific process of the method is shown in FIG. 7, where operations 701 to 703 are the same as operations 101 to 103 in FIG. 1, which will not be repeated here.

In operation 704, when an operating instruction indicating thumbnail display input by the user is detected on the calendar interface, the preset display position is folded up, and the display of the associated information is canceled.

In the operation, when the operating instruction indicating thumbnail display input is detected on the calendar interface of displaying the associated information, it is determined that the display of the associated information is canceled, and the display position is folded up.

The gesture of "swiping up" on the touch screen on the calendar interface may be set as the operating instruction indicating thumbnail display.

Figure 8:
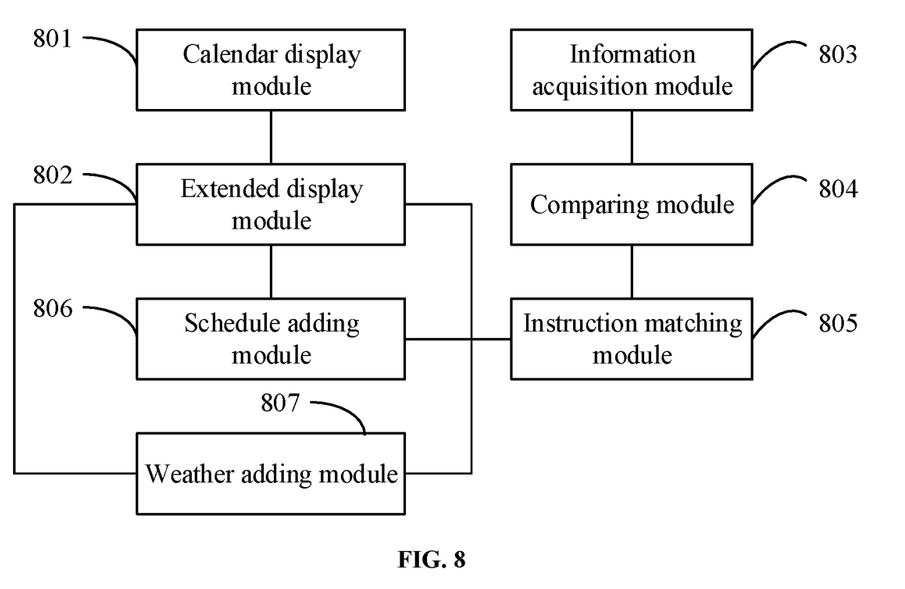
FIG. 8 is a block diagram of a device for managing information, according to an example of the present disclosure.

An embodiment of the present disclosure further provides a device for managing information. As shown in FIG. 8, its structure includes:

a calendar display module 801, configured to display the calendar interface; and an extended display module 802, configured to, when the operating instruction indicating extended display input by a user is detected on the calendar interface, output associated information corresponding to dates at the preset display position of the calendar interface.

The device further includes: an information acquisition module 803, configured to acquire the operating information input by the user through the input device, the input device at least including any one or more of the following devices: a keyboard, a touch screen, and a voice recognition device;

a comparing module 804, configured to compare the operating information with at least one set of preset operating instruction characteristics, each set of operating instruction characteristics corresponding to an operating instruction; and an instruction matching module 805, configured to, in presence of one or more operating instruction characteristics matching the operating information, determine that the user has input the operating instruction corresponding to the operating instruction characteristics.

Figure 9:
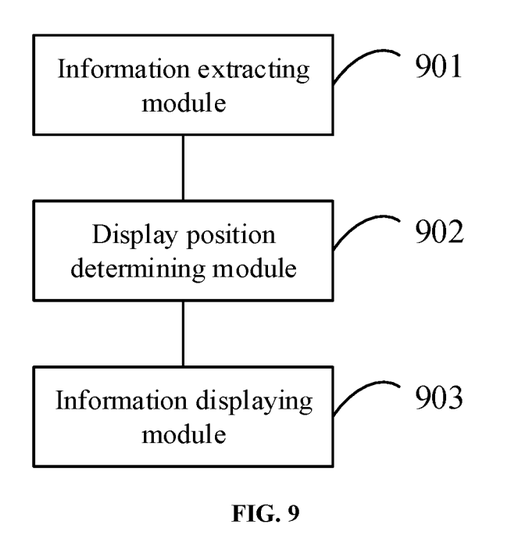
FIG. 9 is a block diagram of a structure of an extended display module 802, according to an example of the present disclosure.

As shown in FIG. 9, the structure of the extended display module 802 includes: an information extracting module 901, configured to extract the associated information corresponding to a date, the associated information at least including the schedule information and/or the weather information; a display position determining module 902, configured to determine the preset display position of each date on the calendar interface, the display position at least including the position below the date; and an information displaying module 903, configured to display the associated information at the preset display position corresponding to the date.

The device further includes: a schedule adding module 806, configured to, when it is detected on the calendar interface that the user has input the operating instruction indicating triggering of schedule setting, acquire the schedule information input by the user and corresponding to a date and save the schedule information in the calendar application.

The device further includes: a weather adding module 807, configured to, when it is detected on the calendar interface that the user has input the operating instruction for setting the weather application, set that the weather information is acquired from the weather application.

Figure 10:
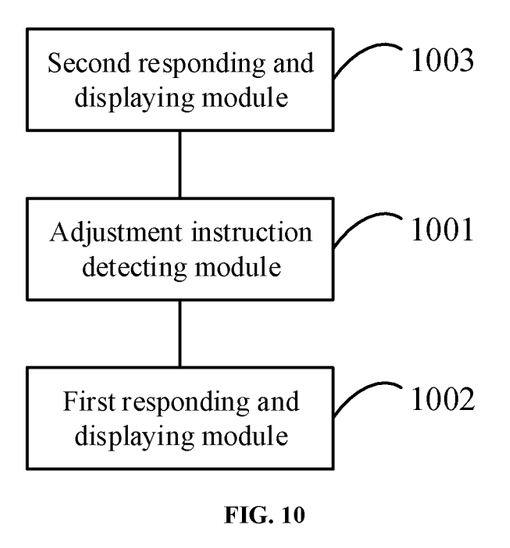
FIG. 10 is a block diagram of a structure of an information displaying module 903, according to an example of the present disclosure.

As shown in FIG. 10, the structure of the information displaying module 903 includes: an adjustment instruction detecting module 1001, configured to detect the operating instruction indicating adjustment of display input by the user, the operating instruction indicating adjustment of display at least including any one of the following operating instructions: dragging the drop-down slider of the display position, and expanding or narrowing the display position; a first responding and displaying module 1002, configured to, in response to the operating instruction for dragging the drop-down slider of the display position, perform scroll display on the associated information at the display position; or, a second responding and displaying module 1003, configured to, in response to the operating instruction for expanding or narrowing the display position, display the associated information so as to adapt to the expanded or narrowed display position.

With regard to the device in the above embodiments, the specific mode of each module performing operations has been described in detail in the embodiments of the method, so it will not be repeated here. The device may be integrated in the terminal devices, such as a mobile phone, a tablet computer, a laptop, a PC, and smart home equipment, and its corresponding functions are implemented by the terminal terminals.

An embodiment of the present disclosure further provides a computer device, which includes: a processor; and a memory configured to store instructions executable by the processor, wherein the processor may be configured to: display a calendar interface; and when an operating instruction indicating extended display input by a user is detected on the calendar interface, output associated information corresponding to a date at a preset display position of the calendar interface.

Figure 11:
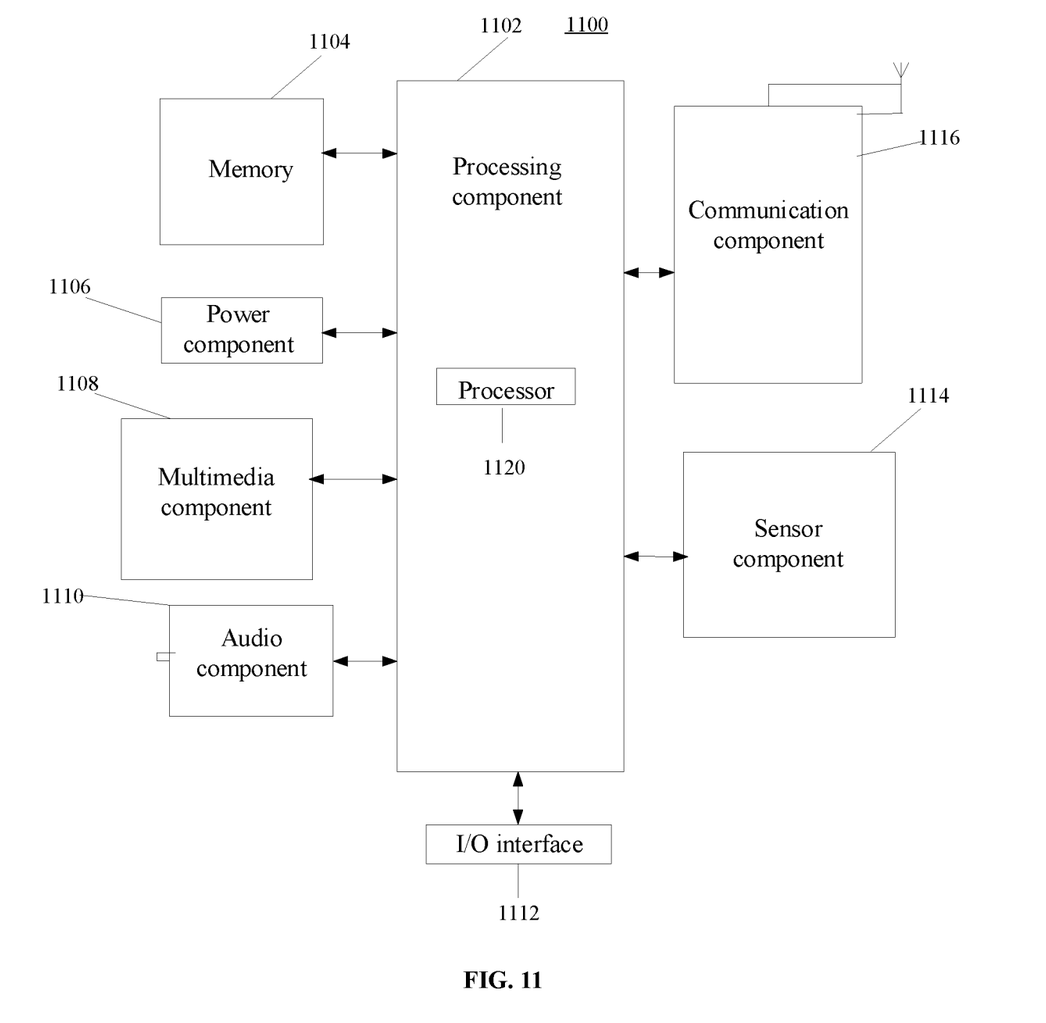
FIG. 11 is a block diagram of a device (general structure of a mobile terminal), according to an example of the present disclosure.

FIG. 11 is a block diagram of a device 1100 for managing information, according to an embodiment. For example, the device 1100 may be a mobile phone, a computer, a digital broadcast terminal, a messaging device, a gaming console, a tablet, a medical device, exercise equipment and a personal digital assistant.

Referring to FIG. 11, the device 1100 may include one or more of the following components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the operations in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the device 1100. Examples of such data include instructions for any application programs or methods operated on the device 1100, contact data, phonebook data, messages, pictures, video, etc. The memory 1104 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 provides power for various components of the device 1100. The power component 1106 may include a power management system, one or more power supplies, and other components associated with generation, management and distribution of power for the device 1100.

The multimedia component 1108 includes a screen providing an output interface between the device 1100 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a Microphone (MIC), and the MIC is configured to receive an external audio signal when the device 1100 is in the operation mode, such as a call mode, a recording mode and a voice recognition mode. The received audio signal may further be stored in the memory 1104 or sent through the communication component 1116. In some embodiments, the audio component 1110 further includes a speaker configured to output the audio signal.

The I/O interface 1112 provides an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 includes one or more sensors configured to provide status assessment in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a proximity sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and another device. The device 1100 may access a communication-standard-based wireless network, such as a Wireless Fidelity (WiFi) network, a 2nd-Generation (2G) or 3rd-Generation (3G) network or a combination thereof. In an embodiment, the communication component 1116 receives a broadcast signal or broadcast associated information from an external broadcast management system through a broadcast channel. In an embodiment, the communication component 1116 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an embodiment, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above mentioned method.

In an embodiment, there is also provided a non-transitory computer-readable storage medium including an instruction, such as the memory 1104 including an instruction, and the instruction may be executed by the processor 1120 of the device 1100 to implement the abovementioned method. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

A non-transitory computer-readable storage medium is provided. When an instruction in the storage medium is executed by the processor of a mobile terminal, the mobile terminal can execute a method for managing information. The method includes that: a calendar interface is displayed; and when an operating instruction indicating extended display input by a user is detected on the calendar interface, associated information corresponding to a date is displayed at a preset display position of the calendar interface.

The present disclosure provides a method and device for managing information. The method includes that: a calendar interface is displayed, and an operating instruction indicating extended display input by a user is detected on the calendar interface; when the operating instruction is detected, associated information corresponding to a date is output at a preset display position of the calendar interface. When calendar information is displayed, two vision modes, namely thumbnail display of only displaying a date and extended display of displaying associated information, are provided. When the extended display is performed, the associated information corresponding to a date is directly presented at the display position corresponding to the date, so there is more information output on the calendar interface, the operation of information management is simplified, and the problem of inconvenience of use for a user is solved.

Furthermore, on the calendar interface, an adding process may be directly triggered through an operating instruction indicating triggering of schedule setting, so the operation of adding related information is simpler and more intuitive, and user experience is further improved.

Furthermore, on the calendar interface, when an operating instruction for setting a weather application is detected, it is set that the weather information is acquired from the weather application, so as to acquire and display the weather information on the calendar interface. So, the content of reminder information is richer, and user experience is further improved.

Other implementations of the present disclosure will be apparent to those skilled in the art from consideration of the specification and practice of the present disclosure. This present application is intended to cover any variations, uses, or adaptations of the present disclosure following the general principles thereof and including such departures from the present disclosure as come within known or customary practice in the art. It is intended that the specification and examples be considered as an example only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for managing information, comprising:
   displaying, at a mobile terminal comprising a microprocessor, a network connection, and a display, a calendar interface comprising a plurality of display sub-regions corresponding to respective dates, all of the plurality of display sub-regions having a same original height; and
   when an operating instruction indicating extended display input by a user is detected on the calendar interface, displaying, at the mobile terminal, the dates in a chronological order in the plurality of display sub-regions and associated information corresponding to the dates at respective preset display positions in respective display sub-regions of the calendar interface, wherein the operation of displaying the associated information corresponding to the dates at respective preset display positions of the calendar interface comprises:
extracting the associated information corresponding to the date, the associated information comprising weather information and at least one of schedule information or user associated information, wherein the user associated information comprises user subscription information;
determining, in a display sub-region corresponding to each of the dates, the preset display position of the date on the calendar interface, the display position at least comprising a position below the date; and
displaying the associated information at the preset display position corresponding to the date, wherein all of the plurality of display sub-regions have their associated information completely displayed in the calendar interface, and all of the plurality of display sub-regions have a same extended height determined by the display sub-region having most pieces of associated information to be displayed.

2. The method for managing information of claim 1, wherein the operating instruction input by the user is detected by:
acquiring, at the mobile terminal, operating information input by the user through an input device, the input device comprising at least one of the following devices:
a keyboard,
a touch screen, and
a voice recognition device;
comparing, at the mobile terminal, the operating information input with at least one set of preset operating instruction characteristics, at least one set of operating instruction characteristics corresponding to one operating instruction; and
when one or more operating instruction characteristics matches the operating information, determining, at the mobile terminal, that the user has input the operating instruction corresponding to the operating instruction characteristics.

3. The method for managing information of claim 1, further comprising:
when it is detected on the calendar interface that the user has input an operating instruction indicating triggering of schedule setting, acquiring, at the mobile terminal, schedule information input by the user and corresponding to a date, and
saving, at the mobile terminal, the schedule information in a calendar application.

4. The method for managing information of claim 1, further comprising:
when it is detected on the calendar interface that the user has input an operating instruction for setting a weather application, setting, at the mobile terminal, that weather information is acquired from the weather application.

5. The method for managing information of claim 1, wherein the operation of displaying the associated information corresponding to the dates at respective preset display positions of the calendar interface comprises:
detecting, at the mobile terminal, an operating instruction indicating adjustment of display input by the user, the operating instruction indicating adjustment of display at least comprising any one of following operating instructions:
dragging a drop-down slider of the display position, and expanding or narrowing the display position;
in response to the operating instruction for dragging the drop-down slider of the display position, performing, at the mobile terminal, scroll display on the associated information at the display position; or,
in response to the operating instruction for expanding or narrowing the display position, displaying, at the mobile terminal, the associated information so as to adapt to the expanded or narrowed display position.

6. The method for managing information of claim 4, wherein the operation of displaying the associated information corresponding to the dates at respective preset display positions of the calendar interface comprises:
detecting, at the mobile terminal, an operating instruction indicating adjustment of display input by the user, the operating instruction indicating adjustment of display at least comprising any one of following operating instructions:
dragging a drop-down slider of the display position, and expanding or narrowing the display position;
in response to the operating instruction for dragging the drop-down slider of the display position, performing, at the mobile terminal, scroll display on the associated information at the display position; or,
in response to the operating instruction for expanding or narrowing the display position, displaying, at the mobile terminal, the associated information so as to adapt to the expanded or narrowed display position.

7. The method for managing information of claim 1, further comprising: after the operation of displaying, at the mobile terminal, the associated information corresponding to the dates at respective preset display positions of the calendar interface:
when an operating instruction indicating thumbnail display input by the user is detected on the calendar interface, folding up, at the mobile terminal, the preset display positions, and canceling the display of the associated information.

8. The method for managing information according to claim 1, wherein the user associated information further comprises a to-do list of the user.

9. A device for managing information, comprising:
a display screen;
one or more processors; and
a non-transitory computer-readable medium storing instructions executable by the one or more processors, wherein the one or more processors are configured to:
cause the display screen to display a calendar interface comprising a plurality of display sub-regions corresponding to respective dates, all of the plurality of display sub-regions having a same original height; and
when an operating instruction indicating extended display input by a user is detected on the calendar interface, display the dates in a chronological order in the plurality of display sub-regions and associated information corresponding to the dates at respective preset display positions in respective display sub-regions of the calendar interface,
wherein the operation of displaying the associated information corresponding to the dates at respective preset display positions of the calendar interface comprises:
extracting the associated information corresponding to the date, the associated information comprising weather information and at least one of schedule information or user associated information, wherein the user associated information comprises user subscription information;

determining, in a display sub-region corresponding to each of the dates, the preset display position of the date on the calendar interface, the display position at least comprising a position below the date; and displaying the associated information at the preset display position corresponding to the date, wherein all of the plurality of display sub-regions have their associated information completely displayed in the calendar interface, and all of the plurality of display sub-regions have a same extended height determined by the display sub-region having most pieces of associated information to be displayed.

10. The device for managing information of claim 9, wherein the operating instruction input by the user is detected by:

acquiring operating information input by the user through an input device, the input device comprising at least one of the following devices:

a keyboard, a touch screen, and a voice recognition device;

comparing the operating information input with at least one set of preset operating instruction characteristics, at least one set of operating instruction characteristics corresponding to one operating instruction; and when one or more operating instruction characteristics matches the operating information, determining that the user has input the operating instruction corresponding to the operating instruction characteristics.

11. The device for managing information of claim 9, wherein the one or more processors are further configured to:

when it is detected on the calendar interface that the user has input an operating instruction indicating triggering of schedule setting, acquire schedule information input by the user and corresponding to a date, and save the schedule information in a calendar application.

12. The device for managing information of claim 9, wherein the one or more processors are further configured to:

when it is detected on the calendar interface that the user has input an operating instruction for setting a weather application, set that weather information is acquired from the weather application.

13. The device for managing information of claim 12, wherein in order to cause the display screen to the associated information corresponding to the dates at respective preset display positions of the calendar interface, the one or more processors are configured to:

detect an operating instruction indicating adjustment of display input by the user, the operating instruction indicating adjustment of display at least comprising any one of following operating instructions:

dragging a drop-down slider of the display position, and expanding or narrowing the display position;

in response to the operating instruction for dragging the drop-down slider of the display position, cause the display screen to perform scroll display on the associated information at the display position; or in response to the operating instruction for expanding or narrowing the display position, cause the display screen to display the associated information so as to adapt to the expanded or narrowed display position.

14. The device for managing information of claim 13, wherein in order to cause the display screen to display the associated information corresponding to the dates at respective preset display positions of the calendar interface, the one or more processors are configured to:

detect an operating instruction indicating adjustment of display input by the user, the operating instruction indicating adjustment of display at least comprising any one of following operating instructions:

dragging a drop-down slider of the display position, and expanding or narrowing the display position;

in response to the operating instruction for dragging the drop-down slider of the display position, cause the display screen to perform scroll display on the associated information at the display position; or in response to the operating instruction for expanding or narrowing the display position, cause the display screen to display the associated information so as to adapt to the expanded or narrowed display position.

15. The device for managing information of claim 9, wherein the one or more processors are further configured to: after displaying associated information corresponding to the dates at respective preset display positions of the calendar interface, when an operating instruction indicating thumbnail display input by the user is detected on the calendar interface, fold up the preset display position, and canceling the display of the associated information.

16. The device for managing information of claim 9, wherein the user associated information further comprises a to-do list of the user.

17. A non-transitory computer-readable storage medium having stored thereon computer-readable instructions that, when executed by one or more processors of a mobile terminal, cause the one or more processors to execute a method for managing information, the method comprises:

displaying a calendar interface comprising a plurality of display sub-regions corresponding to respective dates, all of the plurality of display sub-regions having a same original height; and when an operating instruction indicating extended display input by a user is detected on the calendar interface, displaying the dates in a chronological order in the plurality of display sub-regions and associated information corresponding to the dates at respective preset display positions in respective display sub-regions of the calendar interface, wherein the operation of displaying the associated information corresponding to the dates at respective preset display positions of the calendar interface comprises:

extracting the associated information corresponding to the date, the associated information comprising weather information and at least one of schedule information or user associated information, wherein the user associated information comprises user subscription information;

determining, in a display sub-region corresponding to each of the dates, the preset display position of the date on the calendar interface, the display position at least comprising a position below the date; and displaying the associated information at the preset display position corresponding to the date, wherein all of the plurality of display sub-regions have their associated information completely displayed in the calendar interface, and all of the plurality of display sub-regions have a same extended height determined by the display sub-region having most pieces of associated information to be displayed.

18. The non-transitory computer-readable storage medium according to claim 17, wherein the operating instruction input by the user is detected by:

acquiring operating information input by the user through an input device, the input device comprising at least one of the following devices:

a keyboard, a touch screen, and a voice recognition device;

comparing the operating information input with at least one set of preset operating instruction characteristics, at least one set of operating instruction characteristics corresponding to one operating instruction; and     when one or more operating instruction characteristics matches the operating information, determining that the user has input the operating instruction corresponding to the operating instruction characteristics.

19. The non-transitory computer-readable storage medium according to claim 17, further comprising:

when it is detected on the calendar interface that the user has input an operating instruction for setting a weather application, setting, at the mobile terminal, that weather information is acquired from the weather application.

20. The non-transitory computer-readable storage medium according to claim 17, further comprising:

when it is detected on the calendar interface that the user has input an operating instruction indicating triggering of schedule setting, acquiring, at the mobile terminal, schedule information input by the user and corresponding to a date, and saving, at the mobile terminal, the schedule information in a calendar application.

\* \* \* \* \*